United States Patent [19]

Hirota et al.

[11] Patent Number: 5,073,214

[45] Date of Patent: Dec. 17, 1991

[54] MAGNETIC MATERIAL FOR A MAGNETIC HEAD

[75] Inventors: Ken Hirota, Toyonaka; Mitsuo Satomi, Katano; Koichi Kugimiya, Toyonaka, all of Japan

[73] Assignee: Matsushita Electric Industrial Co., Ltd., Osaka, Japan

[21] Appl. No.: 424,728

[22] Filed: Oct. 20, 1989

[30] Foreign Application Priority Data

Oct. 26, 1988 [JP] Japan .................. 63-269904

[51] Int. Cl.⁵ .................. C22C 38/02; C22C 38/06
[52] U.S. Cl. .................. 148/306; 148/309; 420/78; 420/103
[58] Field of Search .................. 148/306, 307, 309; 420/78, 103

[56] References Cited

U.S. PATENT DOCUMENTS 4,337,087  6/1982  Esashi et al. .................. 420/78
4,969,962 11/1990  Watanabe et al. .................. 148/307

FOREIGN PATENT DOCUMENTS 0331740  9/1989  European Pat. Off. .
2539002  4/1976  Fed. Rep. of Germany .
1243572  9/1960  France .
2314568  1/1977  France .
63-100156 5/1988  Japan .

Primary Examiner—R. Dean
Assistant Examiner—George Wyszomierski
Attorney, Agent, or Firm—Stevens, Davis, Miller & Mosher

[57] ABSTRACT

A magnetic material having an Fe-Si-Al type magnetic alloy with addition of one or more additive elements selected from a group consisting of Be, Mg, Ca, Sr, Ba, Sc, Y, Nb, Ta and Hf. The material has been subjected to an oxidation heat-treatment so as to contain a predetermined amount of oxygen.

6 Claims, 2 Drawing Sheets

FIG. I

MAGNETIC MATERIAL FOR A MAGNETIC HEAD

BACKGROUND OF THE INVENTION

The present invention relates to a soft magnetic material, in particular a magnetic material of metal base suitable for use as the material of a magnetic head, and also to a magnetic head made of such a magnetic material.

Hitherto, a hard Fe-Si-Al type alloy known as Sendust Alloy has been used as a magnetic material of metal base for use as the material of magnetic heads.

This magnetic material of metal base has a high magnetic flux density saturation level but exhibits a large eddy current loss and, hence, a low magnetic permeability particularly in high-frequency region due to too low electrical resistance. In addition, magnetic heads made of this material exhibit inferior wear resistance against abrasion by magnetic tapes, as compared with magnetic heads made of ferrite-type magnetic heads made of oxide magnetic materials.

Thus, magnetic materials for use as the materials of magnetic heads are required to have a high magnetic flux density saturation level and high electrical resistance, as well as high wear resistance to stand frictional contact between the magnetic heads made of such materials and magnetic tapes.

SUMMARY OF THE INVENTION

Accordingly, an object of the present invention is to provide a magnetic material which can meet the above-described demands.

To this end, according to the present invention, there is provided a magnetic material comprising an Fe-Si-Al type alloy containing 5 or 15 wt% of Si, 2 to 7 wt% of Al and the balance substantially Fe, wherein at least one element selected from a group consisting of Be, Mg, Ca, Sr, Ba, Sc, Y, Nb, Ta and Hf is added to said alloy in amount of 0.001 to 1 wt% with respect to the amount of said alloy, and wherein said alloy is made to contain 0.0001 to 1.5 wt% of oxygen.

In the magnetic material of the invention having the features set forth above, the oxide of the above-mentioned additive element forms a high electrical resistance layer along the grain boundary so that the electrical resistance of the material as a bulk is increased to reduce the eddy current loss in the high-frequency region, thus making it possible to obtain a high magnetic permeability.

DESCRIPTION OF THE PREFERRED EMBODIMENT

An embodiment of the magnetic material of the present invention, formed by adding an additive element and oxygen to an Fe-based alloy, in particular an Fe-Si-Al alloy, will be described by way of example. In general, the present invention offers an improvement of wear resistance an Fe-based alloy. The following description, however, will be focused on an Fe-Si-Al type alloy which is specifically useful as a magnetic material.

EXAMPLE

The example concerns a composition having a final composition ratio of 3 to 18 wt% Si, 1 to 9 wt% Al and the balance substantially Fe. Ca was added to this composition in an amount of 0 to 10 wt% to the total weight of the alloy. The metals were weighed and molten in a vacuum atmosphere by high-frequency induction heating so that a Ca-added Fe-Si-Al master alloy (Sendust Alloy) was prepared. The master alloy was heat-treated for 2 hours at 700° C. to 1000° C. within an atmosphere containing 0.01 vol% of $O_2$ and the balance Ar. The heat-treated Sendust Alloy was analyzed so that it was confirmed that the Sendust Alloy contained 0.005 wt% of oxygen.

Figure 1:
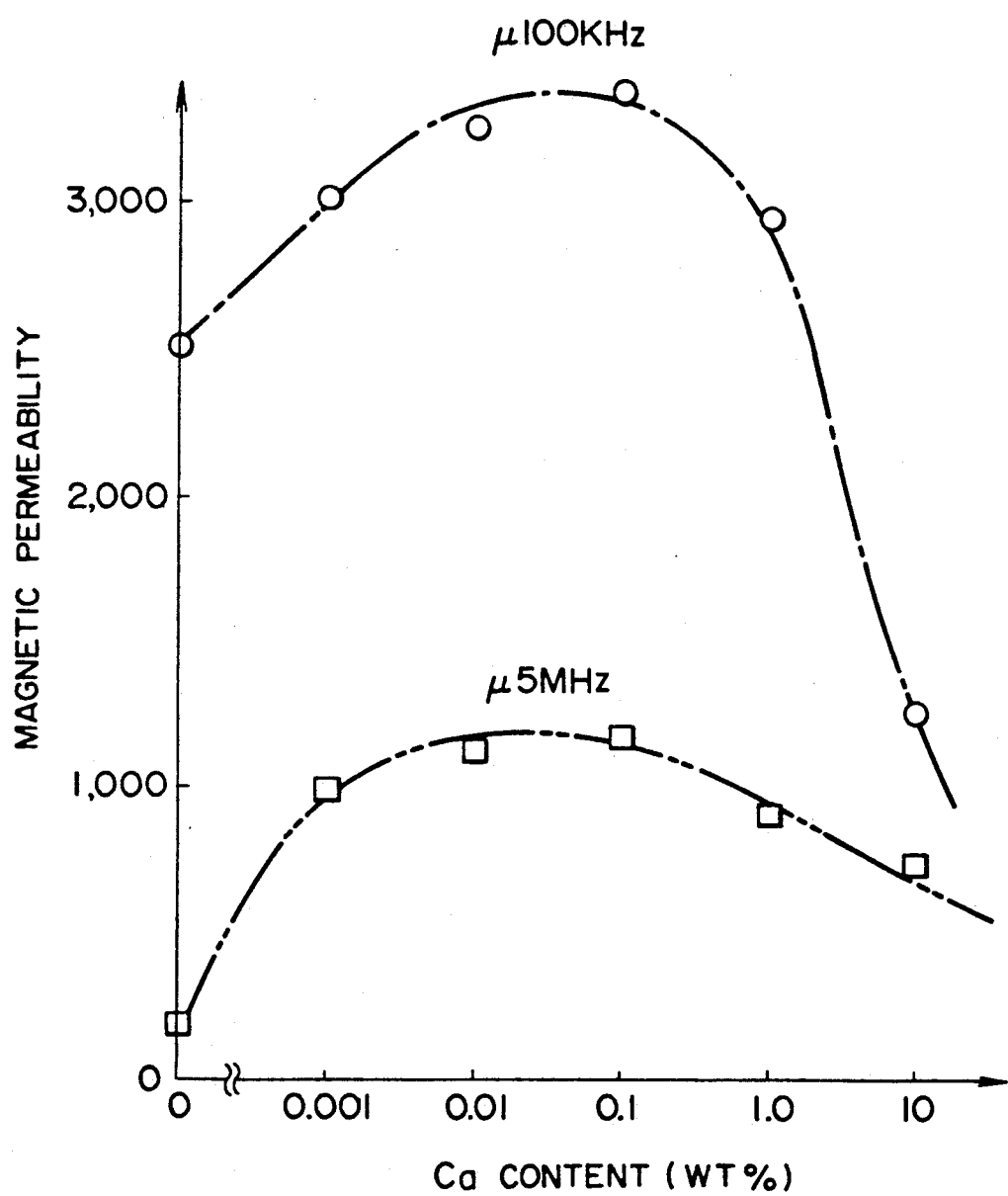
FIG. 1 shows the manner in which magnetic permeability changes as a result of addition of Ca.

A ring having outside and inside diameters of 8 mm and 4 mm and a thickness of 0.2 mm was cut out of the Sendust Alloy piece by electro-spark machining so that a test piece was obtained. The test pieces thus obtained with various Ca contents were subjected to a test for the purpose of evaluating the magnetic characteristics. FIG. 1 shows how the magnetic permeability is changed by varying the Ca content within the range of 0 to 10 wt%.

As will be understood from FIG. 1, when Ca content is not greater than 0.001 wt%, no substantial improvement is attained in the magnetic permeability in the high-frequency region (5 MHz) even by the above-mentioned oxidation treatment. On the other hand, Ca content exceeding 1 wt% causes the magnetic permeability to decrease to levels below 1000 at a low frequency range (100 KHz) after the oxidation treatment, resulting in a large coercive force exceeding 0.5 (Oe) which is quite unsuitable for a magnetic material of a magnetic head. It has thus been confirmed that the best result is obtained when the Ca content ranges between 0.001 and 1 wt%.

Figure 2:
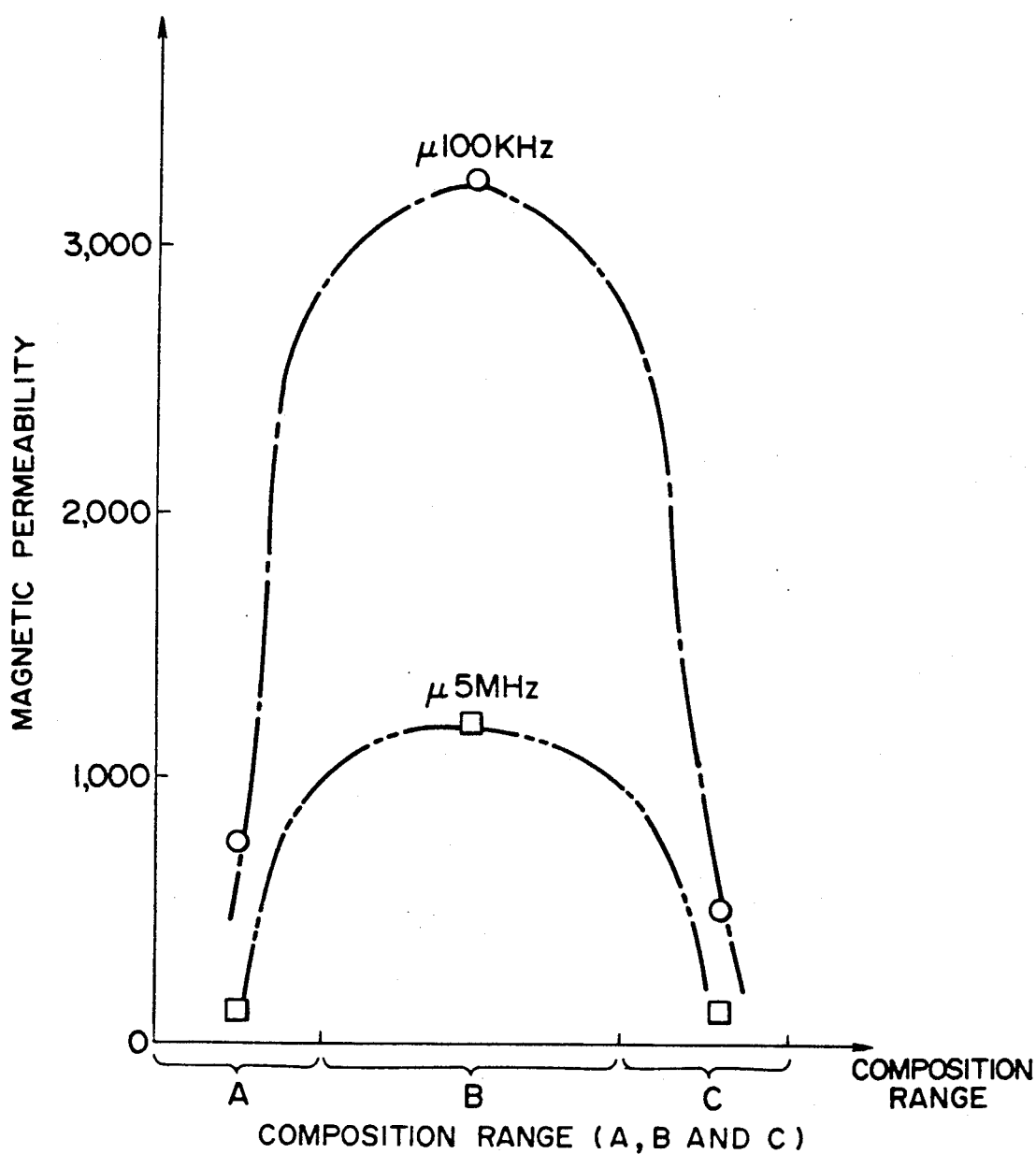
FIG. 2 shows the manner in which the magnetic permeability changes as a result of a change in the composition ratio of an Fe-Si-Al alloy system.

FIG. 2 shows how the magnetic permeability changes when the composition ratio of Fe-Si-Al alloy is changed by addition of 0.001 to 1 wt% of Ca. In this Figure, a region A includes compositions containing 3 to 5 wt% of Si, 1 to 2 wt% of Al and the balance substantially Fe, while a region B covers compositions containing 5 to 15 wt% of Si, 2 to 7 wt% of Al and the balance substantially Fe. A region C covers compositions containing 15 to 18 wt% of Si, 7 to 9 wt% of Al and the balance Fe.

It will be seen from this Figure that the compositions containing 5 to 15 wt% of Si, 2 to 7 wt% of Al and the balance Fe exhibit superior magnetic characteristics, i.e., saturation magnetic flux density of 8,000 G or greater, and magnetic permeability levels $\mu$ of 3,000 or greater and 1,000 or greater at frequencies of 100 KHz and 5 MHz, respectively. Alloy compositions falling out of the region specified above showed too low levels of magnetic permeability $\mu$, and could not be used as a material of a magnetic head.

The Ca-added Fe-Si-Al alloy in accordance with the invention, when containing no oxygen, showed a reduction of magnetic permeability to 200 at 5 MHz, though the saturation magnetic density was 8000 G or greater and the magnetic permeability $\mu$ as high as 3,000 or greater was obtained at 100 KHz. No appreciable effect of oxidation is observed when the oxygen content is 0.0001 wt% or less. Conversely, oxygen content exceeding 1.5 wt% causes an excessive oxidation resulting in a reduction of the magnetic characteristics. The oxygen content, therefore, preferably ranges between 0.0001 and 1.5 wt%.

Grain boundaries in the Sendust Alloys were selectively and gently oxidated when the oxidation treatment temperature ranged between 700° C. and 1000° C. Oxidation treatment at a temperature exceeding 1000° C., on the other hand, caused oxidation of not only the grain boundaries but also the crystal grains themselves, resulting in a serious reduction in the magnetic characteristics. In fact, the magnetic permeability at 100 KHz was as small as several hundreds. On the other hand, oxidation heat treatment at temperatures below 700° C. caused a very slow oxidation at the grain boundaries, requiring a very long time of 100 hours or longer for the heat treatment, which is quite impractical from the industrial point of view. As to the atmosphere of the heat treatment, no substantial effect of oxidation was observed when the oxygen gas content of the oxidation treatment atmosphere was 0.0001 vol% or less. Conversely, oxidation proceeded excessively when the oxygen gas content of the treating atmosphere was 0.1 vol% or greater, resulting in a reduction of the magnetic characteristics. Thus, the heat treatment is preferably conducted in an inert gas of 700° C. to 1000° C. and containing 0.0001 to 0.1 vol% of oxygen gas. High purity Si, Fe and Al, having purity degrees of 99.98% or higher, were weighed to obtain a final composition of 9.5 wt% Si, 5.5 wt% Al and 85 wt% Fe. Then, 0.01 wt% of Ca was added thereto, and the mixture was molten in a vacuum atmosphere by high-frequency induction heating so that a Ca-added Fe-Si-Al master alloy (Sendust Alloy) was formed. The master alloy was mechanically crushed so that a Sendust powder having particle size of 1 to 3 $\mu$m was formed. The Sendust powder, with addition of a sublimation type binder, was compacted at a pressure of 5 tons/cm$^2$ and the compacted body thus obtained was hot-pressed in a vacuum atmosphere for 2 to 3 hours at a temperature of 1200 to 1300° C. and a pressure of 300 to 500 kg/cm$^2$, whereby a Sendust sinter having a high density and a crystal grain size of 5 to 7 $\mu$m was obtained. The Sendust sinter thus obtained was heat-treated at 850° C. in an Ar gas atmosphere containing 0.01 vol% of oxygen gas so that the Sendust material was oxidized an amount of 0.05 wt%.

For the purpose of comparison, high-density Sendust sinter materials of crystal grain sizes of 10 10 $\mu$m, 15 $\mu$m and 50 $\mu$m were prepared by raising the hot-press temperature by 100 to 200° C., and the Sendust sinter test pieces thus obtained were subjected to oxidation heat treatment conducted under the same conditions as described above.

Test pieces of 2×3×0.15 mm were cut out from these Sendust sinter materials and were subjected to a wear resistance test in which the 3×0.15 mm surface of each test piece was held in sliding friction contact with a magnetic tape on a VTR deck for 200 hours, at a temperature of 20° C. and a humidity of 30%. In consequence, the test piece of the Sendust sinter having the crystal grain size of 5 to 7 $\mu$m exhibited a wear in amount of 5 to 10 $\mu$m in the direction perpendicular to the sliding surface. The wear amounts of the test pieces having the crystal grain sizes of 10 $\mu$m, 15 $\mu$m and 50 $\mu$m, respectively, were 15 $\mu$m, 25 to 30 $\mu$m, and 60 $\mu$m. Actual magnetic heads used in sliding contact with magnetic tapes have a practical limit or use which is about 50 $\mu$m as measured in the direction perpendicular to the sliding surface. This means that the Sendust material having a crystal grain size of 50 $\mu$m or greater cannot be used practically. The Sendust material having the crystal grain size of 15 $\mu$m, which exhibits a wear in amount of 30 $\mu$m in 200 hours, also is impractical because the wear amount by sliding contact with a magnetic tape for 500 hours exceeds the above-mentioned practical limit or use. In consequence, it was confirmed through the wear resistance test that the Sendust sintered material having a crystal grain size of 10 $\mu$m or smaller is superior from the view point of wear resistance.

In this embodiment, Ca was added an amount of 0.001 to 1 wt% to the Sendust material having crystal grain size of 10 $\mu$m or smaller and the material thus obtained was subjected to an oxidation heat-treatment so as to make the material contain oxygen. It was confirmed that this material has not only an improved wear resistance but also an improved magnetic characteristic. Namely, the material of the embodiment having a crystal grain size of 10 $\mu$m or smaller exhibited a magnetic permeability $\mu$ of 1000 to 1200 at 5 MHz, whereas, in the case of materials having crystal grain sizes exceeding 10 $\mu$m or greater exhibited, the magnetic permeability $\mu$ was 800 to 1000.

A VTR magnetic head having a magnetic recording track width of 35 $\mu$m was fabricated from an Fe-Si-Al-Ca magnetic material containing 0.05 wt% of oxygen and having a crystal grain size of 10 $\mu$m or smaller. By way of example, a magnetic head was produced from an Fe-Si-Al alloy without any additive element and oxidation, crystal grain size of 50 $\mu$m. Both magnetic heads were subjected to a test conducted by using a $\gamma$-Fe$_2$O$_3$ type magnetic tape for the purpose of evaluating the wear resistance characteristics and magnetic characteristics.

In consequence, it was confirmed that the magnetic head made of the magnetic material of the present invention exhibits a remarkably reduced amount of wear caused by the sliding contact with the magnetic tape, approximately 1/20 to 1/30 that of the magnetic head which is formed from a conventionally used Fe-Si-Al alloy. It is thus understood that the magnetic head made of the magnetic material of the present invention can stand a long use over a period which is 20 or more times longer than that of the magnetic head made from the conventional material.

The magnetic head of the invention made from the Fe-Si-Al-Ca type magnetic material also showed an output which is 5 to 7 dB higher than that produced by the magnetic head made of the conventional material when measured at 5 MHz.

The Fe-Si-Al-Ca type magnetic material of the present invention can be prepared not only through a metallurgical process but through a thin-film forming technique such as sputtering or evaporative deposition.

Although the invention has been described through a specific embodiment in which Ca is added as an additive element, this is only illustrative and the same advantage can be obtained when one or more additive elements selected from a group consisting of alkali earth metals including Be, Mg, Ca, Sr and Ba, and Sc, Y, Nb, Ta and Hf are added such that the total amount of these additive elements ranges between 0.001 and 1 wt%.

As has been described, according to the present invention, it is possible to obtain a metallic magnetic material which exhibits superior characteristics in the high frequency range, as well as excellent mechanical properties, particularly wear resistance.

We claim:

1. A magnetic material comprising an Fe-based alloy consisting essentially of Fe as a main component, 0.001 to 1 wt% of at least one element selected from a group consisting of Be, Mg, Ca, Sr, Ba, Sc, Y, Nb, Ta and Hf, and 0.005 to 1.5 wt% of oxygen.

2. A magnetic material comprising an Fe-based alloy consisting essentially of Fe as a main component, an effective amount of silicon and aluminum to improve the magnetic permeability of the alloy, 0.001 to 1 wt% of at least one element selected from a group consisting of Be, Mg, Ca, Sr, Ba, Sc, Y, Nb, Ta and Hf, and 0.005 to 1.5 wt% of oxygen, wherein said Fe-based alloy is an Fe-Si-Al alloy consisting essentially of 5 to 15 wt% of Si, 2 to 7 wt% of Al, 0.001 to 1 wt% of at least one element selected from a group consisting of Be, Mg, Ca, Sr, Ba, Sc, Y, Nb, Ta and Hf, 0.005 to 1.5 wt% of oxygen and the balance being essentially Fe.

3. A magnetic material according to claim 2, wherein said magnetic material has a mean crystal grain size which is not greater than 10 $\mu$m.

4. A magnetic head having a magnetic core made of a magnetic material comprising an Fe-based alloy consisting essentially of Fe as a main component, at least one element selected from a group consisting of Be, Mg, Ca, Sr, Ba, Sc, Y, Nb, Ta and Hf, and 0.005 to 1.5 wt% of oxygen.

5. A magnetic head comprising a magnetic core made of a magnetic material comprising an Fe-based alloy consisting essentially of Fe as a main component, an effective amount of silicon and aluminum to improve the magnetic permeability of the alloy, at least one element selected from a group consisting of Be, Mg, Ca, Sr, Ba, Sc, Y, Nb, Ta and Hf and 0.005 to 1.5 wt% of oxygen, wherein said Fe-based alloy is an Fe-Si-Al alloy consisting essentially of 5 to 15 wt% of Si, 2 to 7 wt% of Al, 0.001 to 1 wt% of at least one element selected from a group consisting of Be, Mg, Ca, Sr, Ba, Sc, Y, Nb, Ta and Hf, and 0.005 to 1.5 wt% of oxygen and the balance being essentially Fe.

6. A magnetic head according to claim 5, wherein said magnetic material has a mean crystal grain size which is not greater than 10 $\mu$m.

* * * * *